(12) United States Patent
Nguyen et al.

(10) Patent No.: US 11,693,167 B2
(45) Date of Patent: Jul. 4, 2023

(54) SYSTEM AND METHOD FOR IMPROVING THE LASER DAMAGE THRESHOLD OF MULTILAYER DIELECTRIC GRATINGS

(71) Applicant: Lawrence Livermore National Security, LLC, Livermore, CA (US)

(72) Inventors: Hoang T. Nguyen, Livermore, CA (US); Jerald A. Britten, Clayton, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 457 days.

(21) Appl. No.: 16/616,535

(22) PCT Filed: May 24, 2018

(86) PCT No.: PCT/US2018/034498
§ 371 (c)(1),
(2) Date: Nov. 25, 2019

(87) PCT Pub. No.: WO2018/222505
PCT Pub. Date: Dec. 6, 2018

(65) Prior Publication Data
US 2021/0141135 A1 May 13, 2021

Related U.S. Application Data

(60) Provisional application No. 62/512,669, filed on May 30, 2017.

(51) Int. Cl.
*G02B 5/30* (2006.01)
*H01S 3/00* (2006.01)
*G02B 5/18* (2006.01)

(52) U.S. Cl.
CPC ............ *G02B 5/3041* (2013.01); *H01S 3/005* (2013.01); *H01S 3/0057* (2013.01); *G02B 5/1809* (2013.01)

(58) Field of Classification Search
CPC .. G02B 5/1809; G02B 5/1814; G02B 5/1847; G02B 5/1852; G02B 5/1857;
(Continued)

(56) References Cited

U.S. PATENT DOCUMENTS 5,907,436 A    5/1999  Petty et al.
8,116,002 B2   2/2012  Hoose
(Continued)

FOREIGN PATENT DOCUMENTS

CN    101666885 A  *  3/2010
CN    102289014 A     12/2011

OTHER PUBLICATIONS

International Search Report and Written Opinion for PCT/US2018/034498 corresponding to U.S. Appl. No. 16/616,535, 10 pages.
(Continued)

*Primary Examiner* — Ryan S Dunning
(74) *Attorney, Agent, or Firm* — Ladas & Parry, LLP (57) ABSTRACT

A system configuration that significantly improves the laser damage threshold of multi-layer dielectric gratings for lasers applications includes three main sections: 1) a laser module, 2) a TM polarization module, and 3) a multi-layer dielectric grating optimized for high efficiency operation with transverse magnetic polarized laser light.

29 Claims, 9 Drawing Sheets

(58) Field of Classification Search
CPC ... G02B 5/1861; H01S 3/0057; H01S 3/0085; H01S 3/10023; H01S 5/0057; H01S 5/0085; H01S 2301/145
See application file for complete search history.

(56) References Cited

U.S. PATENT DOCUMENTS

| | | | |
|---|---|---|---|
| 2002/0044359 A1* | 4/2002 | Shimmo | G02B 5/1861 359/572 |
| 2006/0152809 A1 | 7/2006 | Smith | |
| 2012/0093191 A1 | 4/2012 | Desserouer | |
| 2015/0034591 A1* | 2/2015 | Vink | G01J 3/18 359/571 |
| 2015/0185413 A1 | 7/2015 | Greiner et al. | |

OTHER PUBLICATIONS

Extended European Search Report from EP app. No. 18810294.1, dated Feb. 4, 2021.

International Preliminary Report on Patentability from PCT/US2018/034498, dated Dec. 3, 2019.

Clausnitzer et al., Highly efficient polarization-independent transmission gratings for pulse stretching and compression, vol. 5252, 2004, pp. 174-182.

Touzet, "New multilayer Dielectric Gratings will Double the Output Power of High Energy Laser", Readout, English Edition, Horiba Technical Reports, vol. 7, 2002, pp. 20-25.

Hocquet et al., "The role of the electric field polarization of the incident laser beam in the short pulse damage mechanism of pulse compression gratings", Applied Physics Letters, AIP Publishing, LLC., vol. 99, No. 6, Aug. 8, 2011.

Xufeng ling et al., "Polarization effect of femtosecond pulse breakdown in subwavelength antireflective relief grating", Optics Communications, Elsevier, Amsterdam, NL, vol. 284, No. 18, Apr. 25, 2011, pp. 4220-4224.

Office action from European Patent Application No. 18810294.1 dated Jan. 13, 2023.

* cited by examiner

SYSTEM AND METHOD FOR IMPROVING THE LASER DAMAGE THRESHOLD OF MULTILAYER DIELECTRIC GRATINGS

CROSS-REFERENCE TO RELATED APPLICATIONS

This application claims the benefit of U.S. Provisional Patent Application No. 62/512,669 titled "System for Improving the Laser Damage Threshold of Multilayer Dielectric Gratings," filed May 30, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to multilayer dielectric gratings (MDGs), and more specifically, it relates to techniques for improving the damage threshold of such gratings.

Description of Related Art

The technique of chirped pulse amplification (CPA) has enabled the generation of Petawatt-class laser systems throughout the world. Existing Petawatt-class lasers are based on Nd:glass architectures with laser pulses nominally of 500 J energy and pulse duration of 500 fs. These laser systems use meter-scale aperture multi-layer dielectric (MLD) gratings to compress the final amplified chirped pulse. The realization of High Energy Petawatt (HEPW) class laser systems, targeting laser pulses of greater >1000 J energy and pulse duration of <500 femtosecond time regime, has been hindered by the limitation of the laser damage threshold (LDT) of the MLD gratings. It is desirable to address the LDT of MLD gratings at a fundamental physics level by redefining how the laser light interacts with the actual grating structure.

SUMMARY

The invention consists of a system configuration that significantly improves the laser damage threshold of multi-layer dielectric (MLD) gratings for laser applications. The system is composed of three main sections: 1) a laser module, 2) a transverse magnetic (TM) polarization module, and 3) a first in class multi-layer dielectric (MLD) grating optimized for high efficiency operation with transverse magnetic polarized laser light.

An embodiment of the TM polarization optimized MLD grating comprises a grating pillar structure having a profile width and height that are respectively wider and taller than those of a transverse electric (TE) polarization optimized multilayer dielectric (MLD) grating for the same center wavelength as the TM polarization optimized MLD grating. Additionally, a multilayer structure supporting the pillar structure comprises alternating index dielectric materials and has a bandwidth that is adjusted for TM polarization. In one embodiment, the grating pillar structure comprises $SiO_2$. More specifically, the profile width and height are respectively about (or at least) 2× wider and taller than those of a transverse electric (TE) polarization optimized MLD grating for the same center wavelength as said TM polarization optimized MLD grating. Embodiments of the invention include methods of use and fabrication of the grating and the system.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Multi-layer dielectric (MLD) gratings have been developed and demonstrated at Lawrence Livermore National Laboratory (LLNL) since the mid 90's. Subsequently, LLNL has only been able to marginally improve the LDT of such gratings. The present invention addresses the LDT of MLD gratings at a fundamental physics level by redefining how the laser light interacts with the actual grating structure. To date, all CPA laser systems utilizing MLD gratings for pulse compression work with transverse electric (TE) polarized light. This is due to the fact that no high efficiency transverse magnetic (TM) polarized MLD gratings have been developed and demonstrated. However, modeling and testing of the present invention clearly indicates that TM polarized MLD gratings exhibit a higher LDT than TE polarized MLD gratings.

Figure 1:
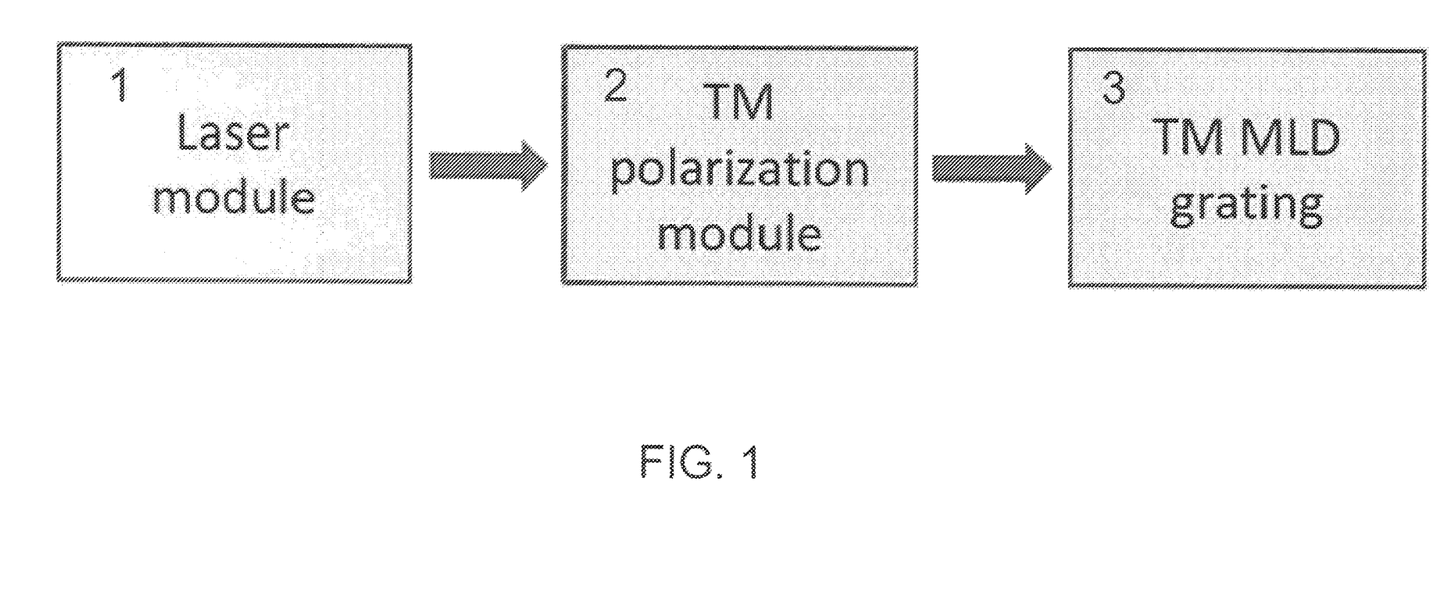
FIG. 1 is a block diagram of the present invention.

The invention facilitates a configuration that significantly improves the laser damage threshold of multi-layer dielectric gratings for lasers applications. FIG. 1 is a block diagram of an embodiment of the present invention. The system of FIG. 1 comprises three main sections: laser module 1, TM polarization module 2 and first in class, multi-layer dielectric grating 3 optimized for high efficiency operation with TM polarized laser light.

Laser module 1 is a device that produces a nearly parallel, nearly monochromatic and coherent beam of light by exciting atoms to a higher energy level and causing them to radiate their energy in phase.

TM polarization module 2 is a device or system that alters or converts the incoming light polarization to TM polarization.

First in class, multi-layer dielectric grating 3 is one that is optimized for high efficiency operation with TM polarized laser light.

Laser induced damage to dielectric optical elements is affected by surface properties and by the presence of structural imperfections that can enhance the electric field. In theory, coupling of radiation energy into the material (and ultimately damage) occurs through the local electric field. It is the instantaneous local value of the electric field that drives damage. In the MLD grating, a complicated distribution of electric field occurs for an incident plane wave. The constructive interference that is responsible for the diffractive behavior of a grating or the reflective properties of a MLD stack can enhance the electric field above values that would occur in unstructured homogeneous material. In particular, local "hot spots" in the grating proper, or in the multi-layer, can increase the intrinsic susceptibility to damage. We have calculated the occurrence of such "hot spots" for practical grating designs and have seen how their location is affected by design parameters.

Figure 2:
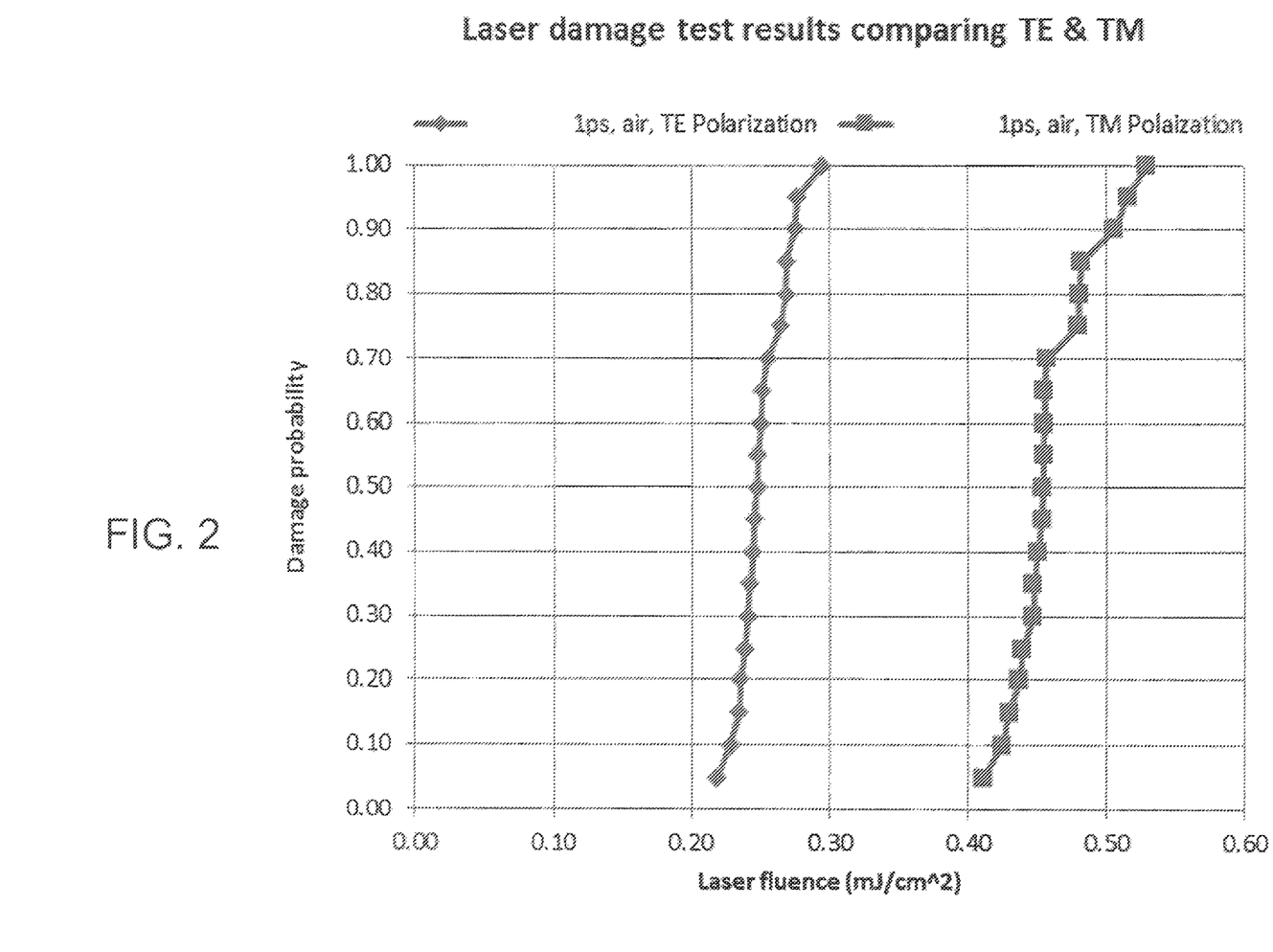
FIG. 2 is a plot of laser damage test results comparing transverse electric (TE) and transverse magnetic (TM) light onto a highly efficient polarization independent sample.

FIG. 2 is a plot of laser damage test results comparing TE and TM light onto a highly efficient polarization independent sample. Notice that when using TE polarized light, at a laser fluence of about 0.22 mJ/cm$^2$, the damage probability is about 0.05. For slight increases in laser fluence, the damage probability increases quickly. However, for the case where TM polarized light is used, the damage probability is about 0.05 at a laser fluence of about 0.41 J/cm$^2$.

Figure 3A:
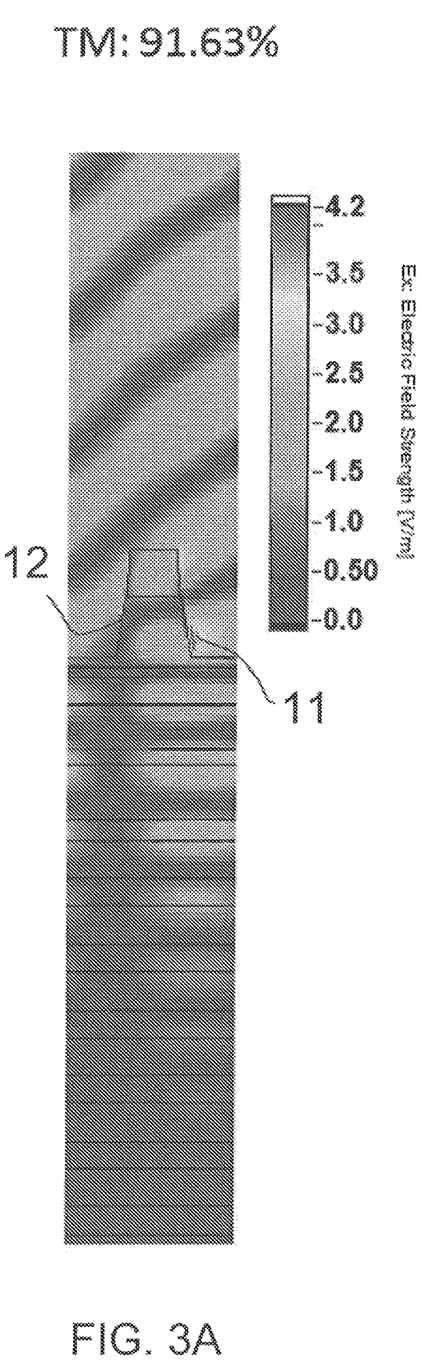
FIGS. 3A and 3B, respectively, show electric field simulation results for identical MLD grating designs comparing TM polarization to TE polarization.
Figure 3B:
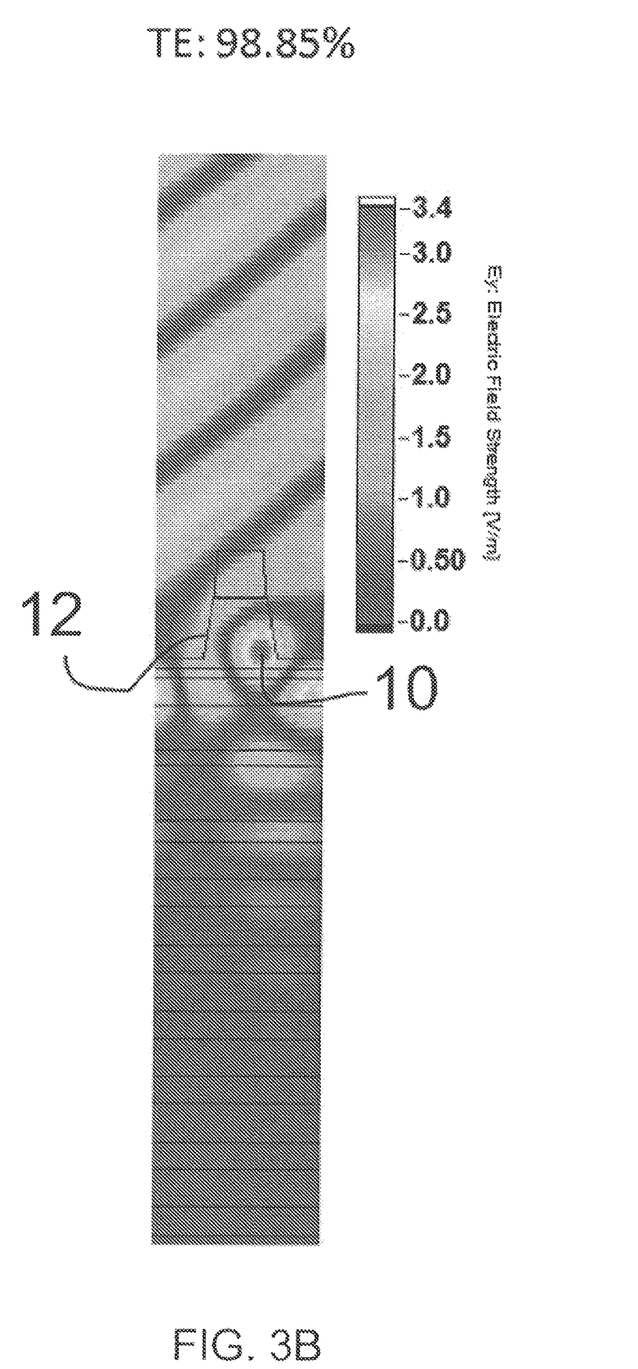
Figure 4A:
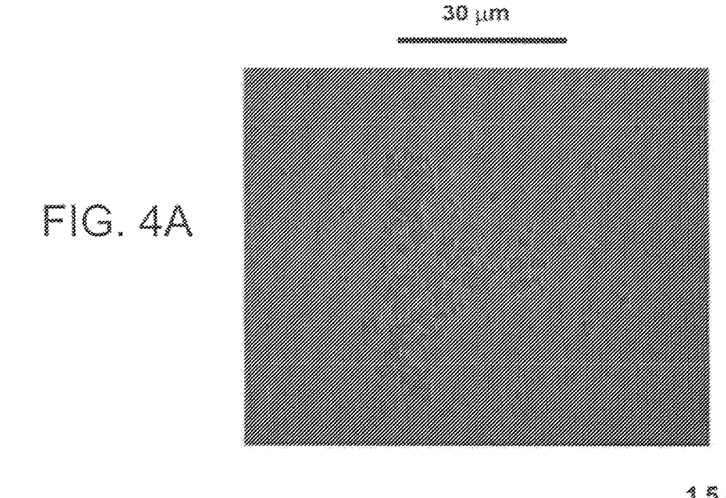
FIGS. 4A-D are scanning electron microscope photographs of a grating optics sample at incipient damage.
Figure 4B:
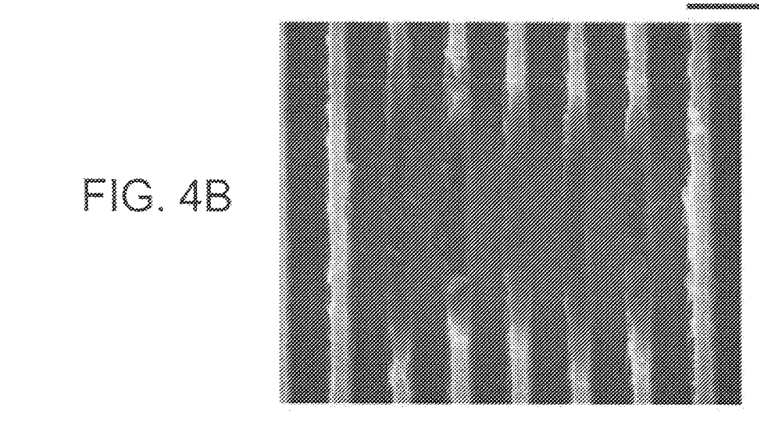
Figure 4C:
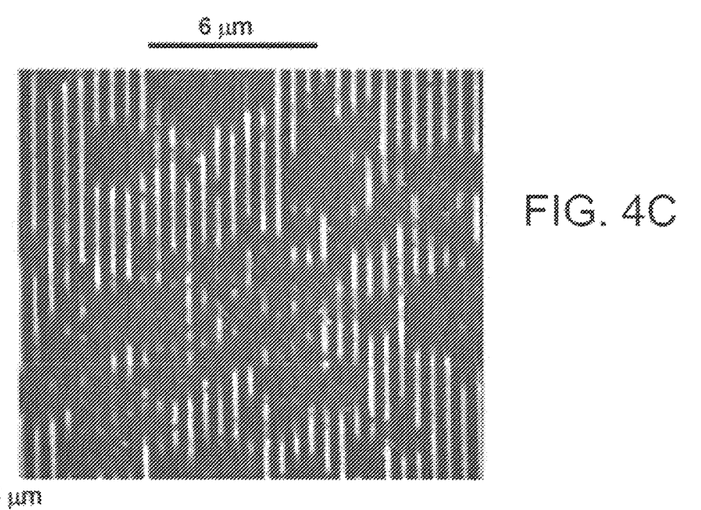
Figure 4D:
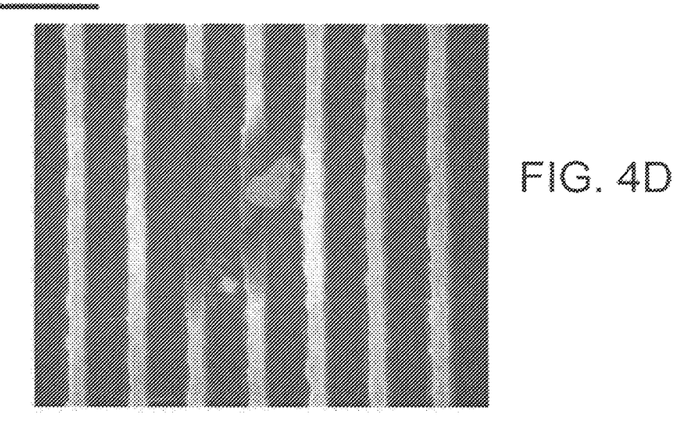

FIGS. 3A and 3B, respectively, show electric field simulation results of for identical MLD grating designs comparing TM polarization to TE polarization. The simulation results illustrate and confirm that the electric field strength within the grating structure is significantly lower for TM polarization versus TE polarization. The lighter shaded areas in the figures have higher electric field strength relative to the darker shaded areas. Note in FIG. 3A that the area of electric field enhancement 11 is outside of the area of the grating 12 for the TM case. In FIG. 3B, the area of electric field enhancement 10 is inside of the area of the grating 12 for the TE case.

FIGS. 4A-D are scanning electron microscope photographs of a grating optics sample at incipient damage, characterized by knocking over of the grating lines (structure) without damage to the underlying multilayer dielectric stack.

Figure 5A:
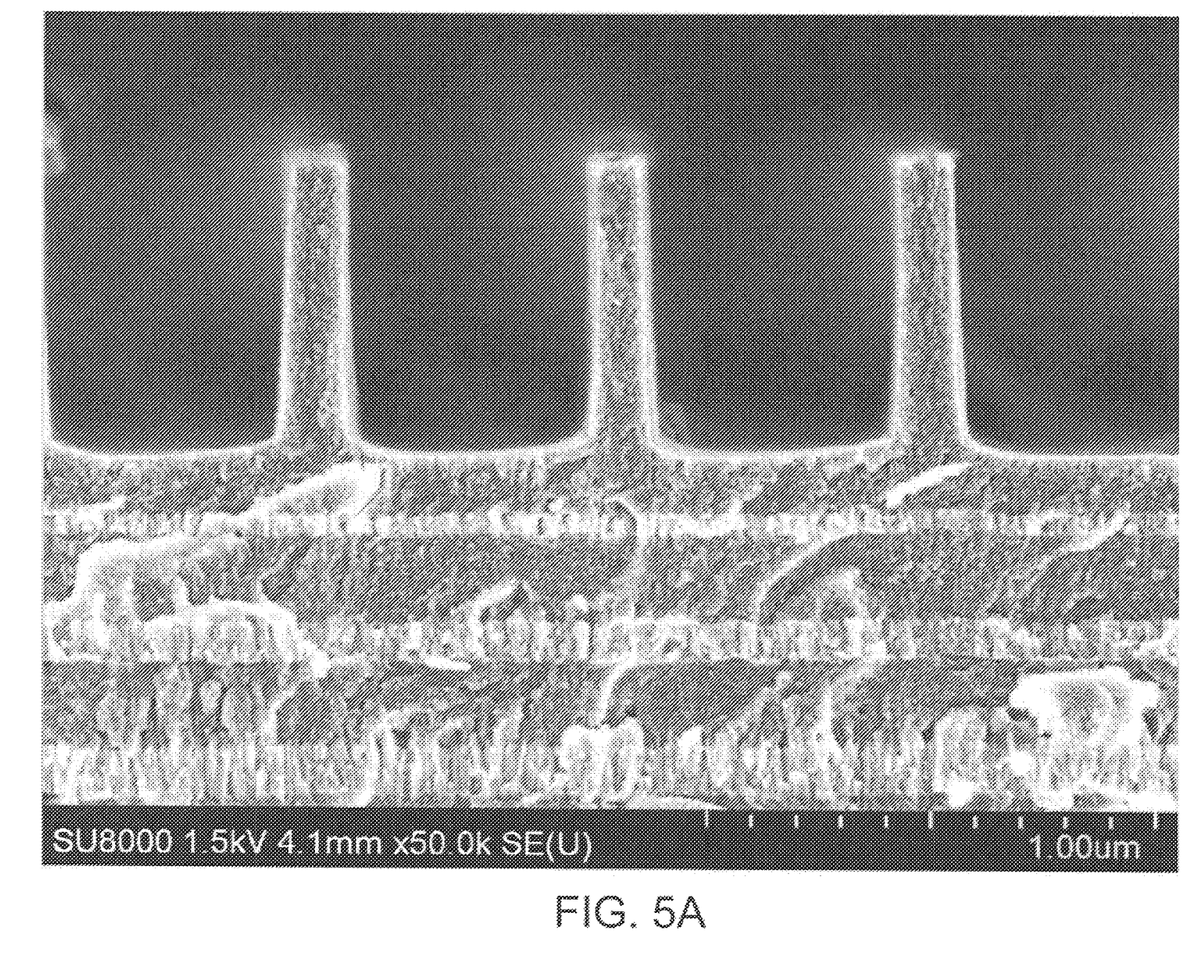
FIG. 5A shows a typical pillar profile used for TE gratings.
Figure 5B:
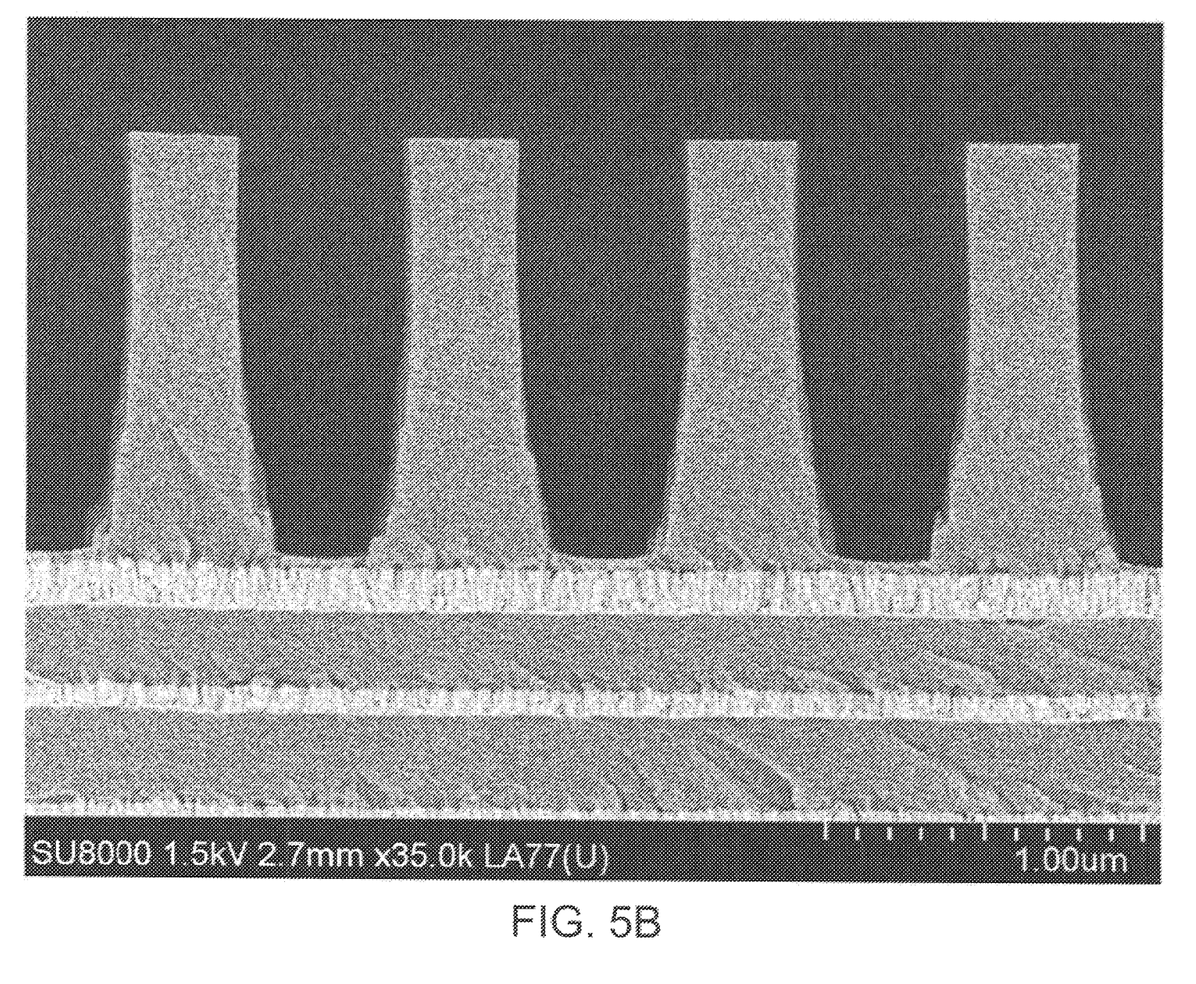
FIG. 5B shows an exemplary pillar profile used for TM gratings.
Figure 6A:
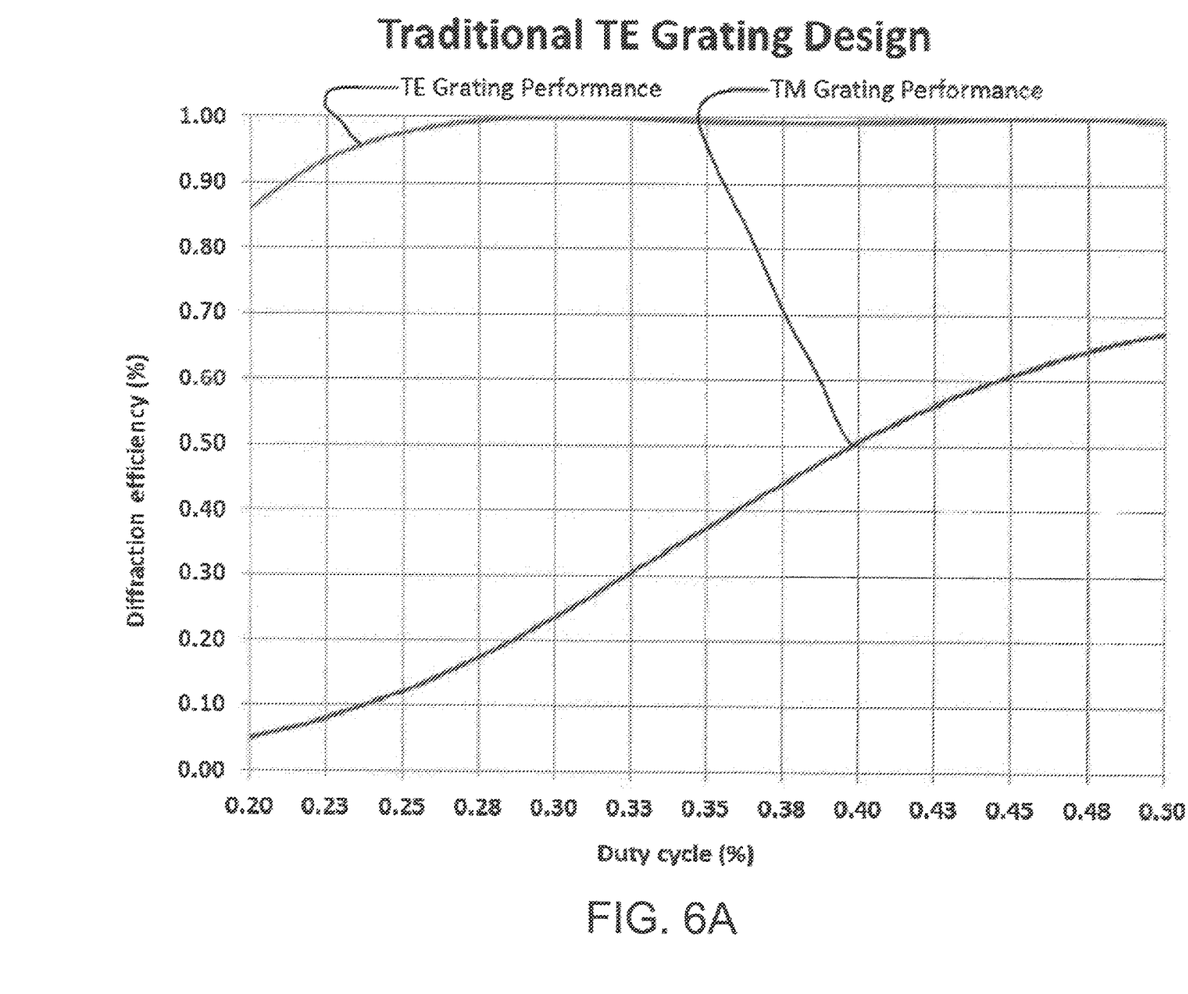
FIG. 6A is a graph of TE grating performance and TM grating performance for a traditional TE grating design.
Figure 6B:
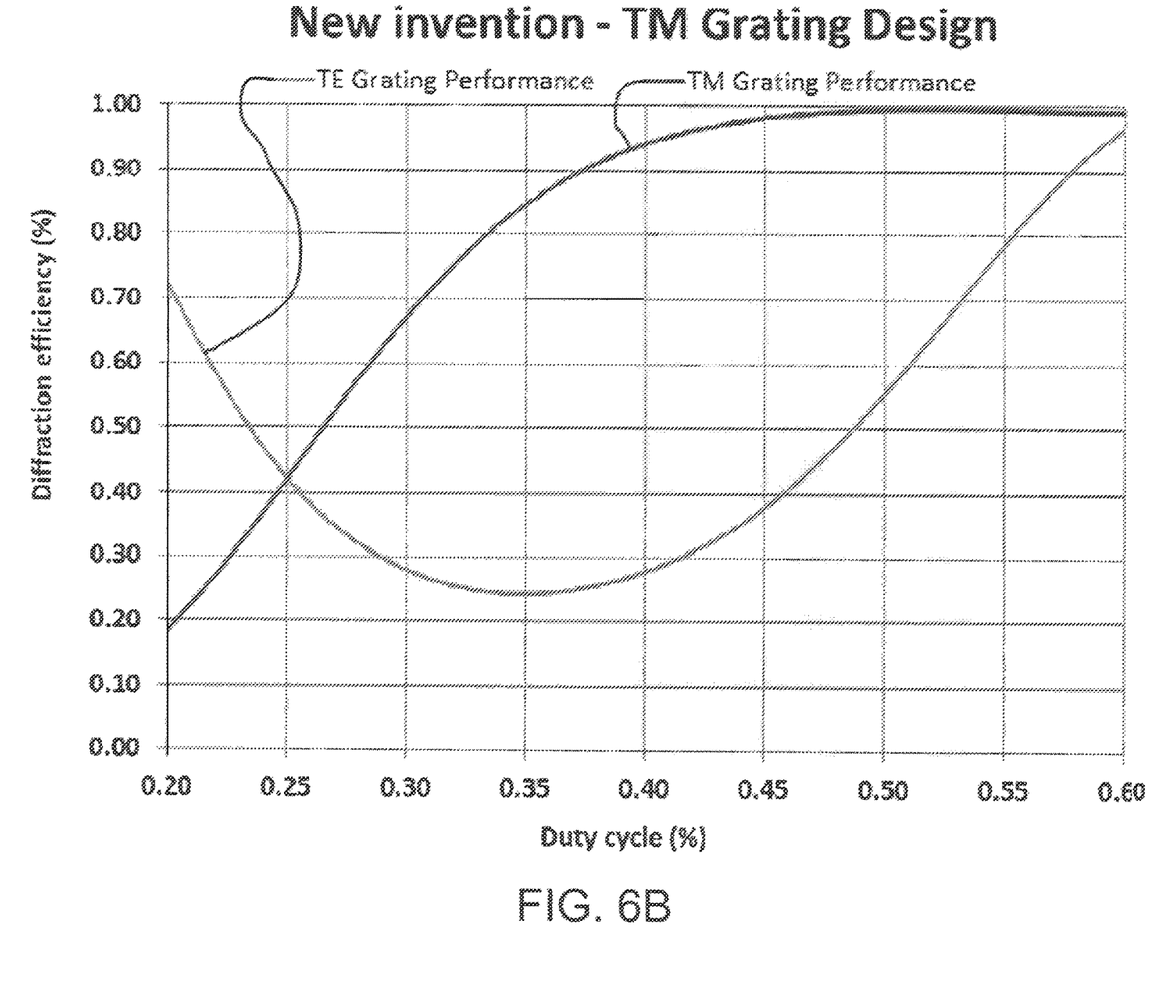
FIG. 6B is a graph of TE grating performance and TM grating performance for a TM grating design according to the present invention.

It is a desire in the present technology to provide dielectric grating structures with high diffraction efficiency and high laser damage resistance, used in refection for transverse-magnetic (TM) polarized light. To maximize laser damage resistance, it is necessary to create the grating pillar structure in SiO2, as opposed to higher-index materials. TM polarization gratings made with SiO2 pillars generally require a different grating pillar shape than that of traditional TE polarization gratings to achieve high diffraction efficiency performance. Compared to the design for a TE grating, the grating profile widths of a TM grating need to be at least 2× wider and the grating profile heights need to be at least 2× taller. FIG. 5A shows a typical pillar profile used for TE gratings. FIG. 5B shows an exemplary pillar profile used for TM gratings. FIG. 6A is a graph of TE grating performance and TM grating performance for a traditional TE grating design. FIG. 6B is a graph of TE grating performance and TM grating performance for a TM grating design according to the present invention.

Figure 5C:
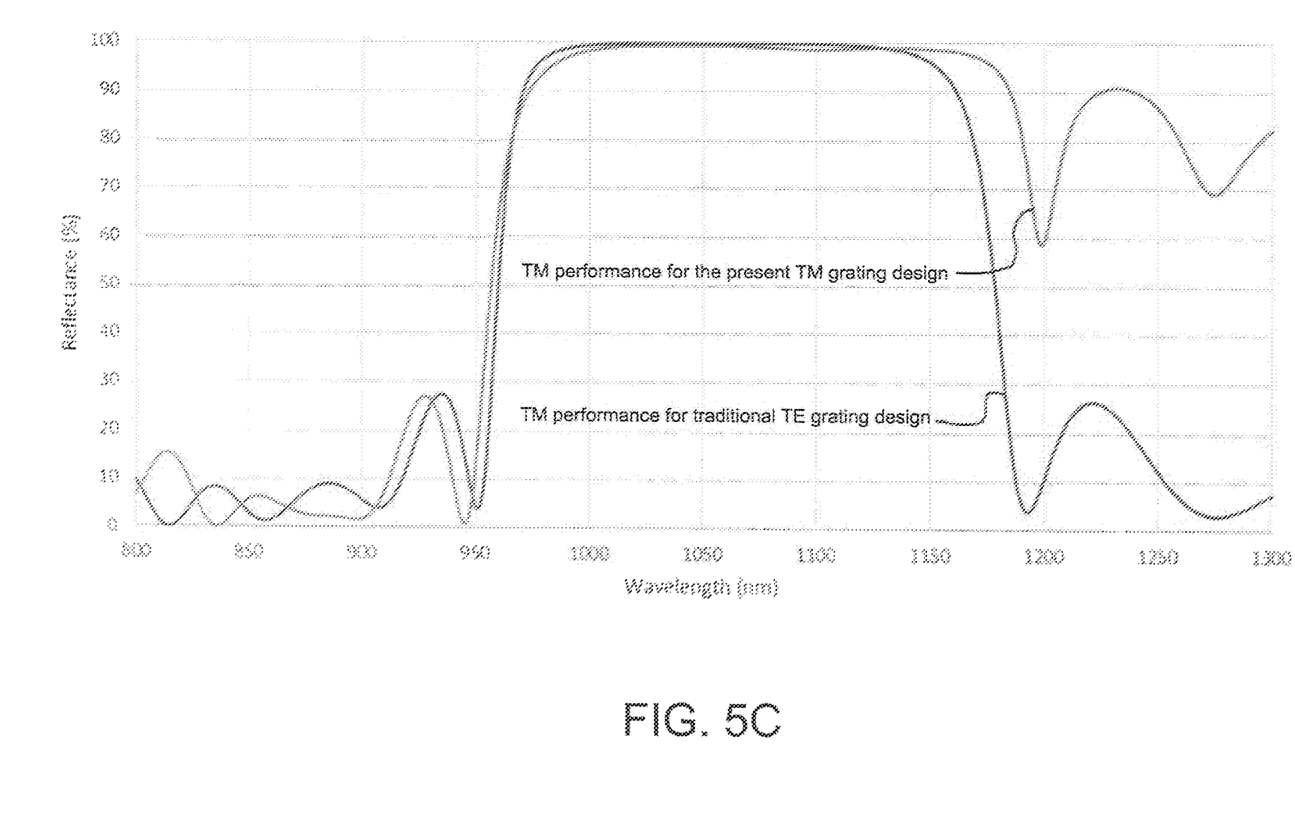
FIG. 5C is a graph showing TM performance for traditional TE grating design compared to TM performance for the present TM grating design.

It is of note that construction of the multilayer structure by alternating index dielectric materials is adjusted for TM polarization use. The multilayer structure, when operated at a large incident angles (>30 deg) as it would be in a laser system, has reduced optical bandwidth for TM-polarized light when compared to TE-polarized light for the same structure. The construction of a TM optimized multilayer structure needs to have an optical bandwidth that is at least 10% to 20% larger. FIG. 5C compares the reflection bandwidth of a traditional TE grating design multilayer coating with that of the invention TM grating design.

As mentioned above, the SiO2 grating structure atop the multilayer structure must also be adjusted for TM polarization use. For example, a grating structure for traditional TE grating design is typically 600 nm to 700 nm tall with a width between 230 nm to 300 nm for a grating period of 880 nm at an incidence angle of 37 deg. Whereas, a grating structure for the invention TM grating design would need to be about 1350 nm, to 1450 nm tall with a width between about 400 nm to 600 nm for the same grating period and incidence angle.

Those skilled in the art know how to design a TE grating. See e.g., U.S. Pat. No. 5,907,436 titled Multilayer Dielectric Gratings, by the present inventors, incorporated herein by reference. A method for fabricating an optimized TM grating is to design an optimized TE grating and then refine the ML structure to have the desired optical bandwidth for TM polarization and make the grating profile width and height to be wider than that of the TE grating. Optimization procedures are known in the art and include the use of computer models. For a SiO2 pillar design, and example height and width would be about 2× wider than the TE grating and also about 2× taller.

Referring to Table 1, preliminary laser damage testing (LDT) results of a polarization insensitive grating optic (Sample A, achieving >98% diffraction efficiency for both TE and TM) clearly show that the LDT for TM polarization (P polarization) is higher than for the TE polarization (S polarization).

TABLE 1

| Sample | 50% Damage probability | |
|---|---|---|
| | 1 ps, S (TE) | 1 ps, P (TM) |
| Sample A | 0.24 (air) | 0.45 (air) |
| Sample B | 0.26 (air) | 0.41 (air) |

Concepts:
This writing presents at least the following concepts.
1. A system, comprising:
   means for providing polarized light;
   a transverse magnetic (TM) polarization optimized multilayer dielectric (MLD) grating; and
   means for directing said polarized light onto said TM polarization optimized MLD grating such that said light is TM polarized relative to said grating.
2. The system of concepts 1, 9 and 10, wherein said TM polarization optimized MLD grating comprises:
   a grating pillar structure having a profile width that is wider than that of a transverse electric (TE) polarization optimized multilayer dielectric (MLD) grating for the same center wavelength as said TM polarization optimized MLD grating, wherein said pillar structure has a grating profile height that is taller than that of a transverse electric (TE)

polarization optimized MLD grating for the same center wavelength as said TM polarization optimized MLD grating; and a multilayer structure supporting said pillar structure, wherein said multilayer structure comprises alternating index dielectric materials and has a bandwidth that is adjusted for TM polarization.

3. The system of concept 2, wherein said grating pillar structure comprises $SiO_2$.

4. The system of concept 2, wherein said profile width and said profile height are optimized for TM polarization.

5. The system of concept 2, wherein said profile width is about 2× wider than that of a transverse electric (TE) polarization optimized MLD grating for the same center wavelength as said TM polarization optimized MLD grating, wherein said grating profile height is about 2× taller than that of a transverse electric (TE) polarization optimized MLD grating for the same center wavelength as said TM polarization optimized MLD grating.

6. The system of concept 2, wherein said profile width is at least 2× wider than that of a transverse electric (TE) polarization optimized MLD grating for the same center wavelength as said TM polarization optimized MLD grating, wherein said grating profile height is at least 2× taller than that of a transverse electric (TE) polarization optimized MLD grating for the same center wavelength as said TM polarization optimized MLD grating.

7. The system of concept 2, wherein said bandwidth is at least 10% greater than that of a transverse electric (TE) polarization optimized MLD grating for the same center wavelength as said TM polarization optimized MLD grating.

8. The system of concept 2, wherein said bandwidth is between 10% and 20% greater than that of a transverse electric (TE) polarization optimized MLD grating for the same center wavelength as said TM polarization optimized MLD grating.

9. The system of concepts 1-8 and 10, wherein said means for providing polarized light comprises a laser module and wherein said means for directing said polarized light comprises a TM polarization module.

10. The system of concepts 1-9, wherein said light is TM polarized relative to said grating such that the magnetic field vector of said light is parallel to the grating lines of said grating.

11. A method, comprising:
directing polarized light onto a transverse magnetic (TM) polarization optimized multilayer dielectric (MLD) grating such that said light is TM polarized relative to said grating.

12. The method of concepts 11 and 19, wherein said TM polarization optimized MLD grating comprises:
a grating pillar structure having a profile width that is wider than that of a transverse electric (TE) polarization optimized MLD grating for the same center wavelength as said TM polarization optimized MLD grating, wherein said pillar structure has a grating profile height that is taller than that of a transverse electric (TE) polarization optimized MLD grating for the same center wavelength as said TM polarization optimized MLD grating.

13. The method of concept 12, wherein said grating pillar structure comprises $SiO_2$.

14. The method of concept 12, wherein said profile width and said profile height are optimized for TM polarization.

15. The method of concept 12, wherein said profile width is about 2× wider than that of a transverse electric (TE) polarization optimized MLD grating for the same center wavelength as said TM polarization optimized MLD grating, wherein said grating profile height is about 2× taller than that of a transverse electric (TE) polarization optimized MLD grating for the same center wavelength as said TM polarization optimized MLD grating.

16. The method of concept 12, wherein said profile width is at least 2× wider than that of a transverse electric (TE) polarization optimized MLD grating for the same center wavelength as said TM polarization optimized MLD grating, wherein said grating profile height is at least 2× taller than that of a transverse electric (TE) polarization optimized MLD grating for the same center wavelength as said TM polarization optimized MLD grating.

17. The method of concept 12, wherein said bandwidth is at least 10% greater than that of a transverse electric (TE) polarization optimized MLD grating for the same center wavelength as said TM polarization optimized MLD grating.

18. The method of concept 12, wherein said bandwidth is between 10% and 20% greater than that of a transverse electric (TE) polarization optimized MLD grating for the same center wavelength as said TM polarization optimized MLD grating.

19. The method of concepts 11-18 and 20, wherein said light is provided by a laser and wherein said the step of directing polarized light onto a transverse magnetic (TM) polarization optimized multilayer dielectric (MLD) grating such that said light is TM polarized relative to said grating is carried out with a TM polarization module.

20. The method of concept 19, wherein said TM polarization module alters or converts said light such that it is TM polarized relative to said grating.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following: A system configuration that significantly improves the laser damage threshold of multi-layer dielectric gratings for lasers applications includes three main sections: 1) a laser module, 2) a TM polarization module, and 3) a multi-layer dielectric grating optimized for high efficiency operation with transverse magnetic polarized laser light.

We claim:

1. A system, comprising:
means for providing polarized light;
a transverse magnetic (TM) polarization optimized multilayer dielectric (MLD) grating arranged for operating at a first center wavelength; and
means for directing said polarized light onto said TM polarization optimized MLD grating such that said light is TM polarized relative to said grating,
wherein said TM polarization optimized MLD grating comprises:
a grating pillar structure having a first profile width and a first grating profile height, wherein said first profile width and said first grating profile height are respectively wider and taller than those of a transverse electric (TE) polarization optimized multilayer dielectric (MLD) grating arranged for operating at said first center wavelength; and a multilayer structure supporting said pillar structure, wherein said multilayer structure comprises alternating index dielectric materials and has a bandwidth that is adjusted for TM polarization.

2. The system of claim 1, wherein said grating pillar structure comprises SiO$_2$.

3. The system of claim 1, wherein said first profile width and said first grating profile height are optimized for TM polarization.

4. The system of claim 1, wherein said profile width is about 2× wider than that of said transverse electric (TE) polarization optimized MLD grating arranged for operating at said first center wavelength and wherein said first grating profile height is about 2× taller than that of said transverse electric (TE) polarization optimized MLD grating arranged for operating at said first center wavelength.

5. The system of claim 1, wherein said first profile width is at least 2× wider than that of said transverse electric (TE) polarization optimized MLD grating arranged for operating at said first center wavelength and wherein said first grating profile height is at least 2× taller than that of said transverse electric (TE) polarization optimized MLD grating arranged for operating at said first center wavelength.

6. The system of claim 1, wherein said bandwidth is at least 10% greater than that of said transverse electric (TE) polarization optimized MLD grating arranged for operating at said first center wavelength.

7. The system of claim 1, wherein said bandwidth is between 10% and 20% greater than that of said transverse electric (TE) polarization optimized MLD grating arranged for operating at said first center wavelength.

8. The grating of claim 1, wherein said bandwidth is at least 10% greater than that of said transverse electric (TE) multilayer dielectric (MLD) grating arranged for operating at said first center wavelength.

9. The system of claim 1, wherein said means for providing polarized light comprises a laser and wherein said means for directing said polarized light comprises a TM polarization device.

10. The system of claim 9, wherein said TM polarization device alters or converts said light such that it is transverse magnetic polarized relative to said grating.

11. A method, comprising:
directing polarized light onto a transverse magnetic (TM) polarization optimized multilayer dielectric (MLD) grating such that said light is TM polarized relative to said grating,
wherein said transverse magnetic (TM) polarization optimized multilayer dielectric (MLD) grating is arranged for operating at a first center wavelength and comprises:
a grating pillar structure having a first profile width and a first grating profile height, wherein said first profile width and said first grating profile height are respectively wider and taller than those of a transverse electric (TE) polarization optimized multilayer dielectric (MLD) grating arranged for operating at said first center wavelength; and
a multilayer structure supporting said pillar structure, wherein said multilayer structure comprises alternating index dielectric materials and has a bandwidth that is adjusted for TM polarization.

12. The method of claim 11, wherein said grating pillar structure comprises SiO$_2$.

13. The method of claim 11, wherein said first profile width and said first grating profile height are optimized for TM polarization.

14. The method of claim 11, wherein said first profile width is about 2× wider than that of a transverse electric (TE) polarization optimized MLD grating arranged for operating at said first center wavelength and wherein said first grating profile height is about 2× taller than that of a transverse electric (TE) polarization optimized MLD grating arranged for operating at said first center wavelength.

15. The method of claim 11, wherein said first profile width is at least 2× wider than that of said transverse electric (TE) polarization optimized MLD grating arranged for operating at said first center wavelength and wherein said first grating profile height is at least 2× taller than that of said transverse electric (TE) polarization optimized MLD grating arranged for operating at said first center wavelength.

16. The method of claim 11, wherein said bandwidth is at least 10% greater than that of said transverse electric (TE) polarization optimized MLD grating arranged for operating at said first center wavelength.

17. The method of claim 11, wherein said bandwidth is between 10% and 20% greater than that of said transverse electric (TE) polarization optimized MLD grating arranged for operating at said first center wavelength.

18. The method of claim 11, wherein said light is provided by a laser and wherein said the step of directing polarized light onto a transverse magnetic (TM) polarization optimized multilayer dielectric (MLD) grating such that said light is TM polarized relative to said grating is carried out with a TM polarization module.

19. The method of claim 18, wherein said TM polarization module alters or converts said light such that it is TM polarized relative to said grating.

20. A transverse magnetic (TM) multilayer dielectric (MLD) grating arranged for operating at a first center wavelength, said grating comprising:
a grating pillar structure having a first profile width and a first grating profile height, wherein said first profile width and said first grating profile height are respectively wider and taller than those of a transverse electric (TE) multilayer dielectric (MLD) grating arranged for operating at said first center wavelength; and
a multilayer structure supporting said pillar structure, wherein said multilayer structure comprises alternating index dielectric materials and has a bandwidth that is adjusted for TM polarization.

21. The grating of claim 20, wherein said grating pillar structure comprises SiO$_2$.

22. The grating of claim 20, wherein said first profile width and said first grating profile height are optimized for TM polarization.

23. The grating of claim 20, wherein said first profile width is about 2× wider than that of said transverse electric (TE) multilayer dielectric (MLD) grating arranged for operating at said first center wavelength and wherein said first grating profile height is about 2× taller than that of said transverse electric (TE) multilayer dielectric (MLD) grating arranged for operating at said first center wavelength.

24. The grating of claim 20, wherein said first profile width is at least 2× wider than that of said transverse electric (TE) multilayer dielectric (MLD) grating arranged for operating at said first center wavelength and wherein said first grating profile height is at least 2× taller than that of said transverse electric (TE) multilayer dielectric (MLD) grating arranged for operating at said first center wavelength.

25. The grating of claim 20, wherein said bandwidth is between 10% and 20% greater than that of said transverse electric (TE) multilayer dielectric (MLD) grating arranged for operating at said first center wavelength.

26. The grating of claim 20, wherein said grating, in use, is operatively coupled with a laser and a TM polarization device whereby light from the laser is supplied to said TM polarization device before light from the TM polarization device is supplied to the grating.

27. The grating of claim 26, wherein said TM polarization device alters or converts light emanating from said laser such that it is transverse magnetic polarized relative to said grating.

28. In combination, the grating of claim 20 and a source of polarized light directed said onto said grating.

29. The combination of claim 28 wherein said light is TM polarized relative to said grating.

* * * * *